US 11,425,480 B2

(12) United States Patent
Hedh et al.

(10) Patent No.: US 11,425,480 B2
(45) Date of Patent: Aug. 23, 2022

(54) USER INPUT ELEMENT

(71) Applicant: Zound Industries International AB, Stockholm (SE)

(72) Inventors: André Hedh, Stockholm (SE); Daniel Andersson, Stockholm (SE); Axel Bluhme, Stockholm (SE)

(73) Assignee: Zound Industries International AB, Stockholm (SE)

( * ) Notice: Subject to any disclaimer, the term of this patent is extended or adjusted under 35 U.S.C. 154(b) by 30 days.

(21) Appl. No.: 17/070,399

(22) Filed: Oct. 14, 2020

(65) Prior Publication Data
US 2021/0120328 A1 Apr. 22, 2021

(30) Foreign Application Priority Data

Oct. 21, 2019 (SE) .................................. 1951188-0

(51) Int. Cl.
*H04R 1/00* (2006.01)
*H04R 1/10* (2006.01)
*G06F 3/041* (2006.01)
*H04R 1/02* (2006.01)

(52) U.S. Cl.
CPC ......... *H04R 1/1016* (2013.01); *G06F 3/0414* (2013.01); *H04R 1/028* (2013.01); *H04R 1/105* (2013.01); *G06F 2203/04105* (2013.01)

(58) Field of Classification Search
CPC ...... H04R 1/028; H04R 1/105; H04R 1/1016; H04R 1/1041; H04R 2225/61; G06F 3/0414; G06F 2203/04105; G01L 1/20
See application file for complete search history.

(56) References Cited

U.S. PATENT DOCUMENTS

| | | | |
|---|---|---|---|
| 8,891,798 | B1 | 11/2014 | Laffon de Mazieres et al. |
| 2009/0023417 | A1 | 1/2009 | Davis et al. |
| 2009/0196436 | A1* | 8/2009 | Westenbroek ...... H04M 1/6066 381/104 |
| 2016/0356658 | A1* | 12/2016 | Hou ..................... H01C 10/103 |
| 2019/0082250 | A1 | 3/2019 | Cruz-Hernandez |

FOREIGN PATENT DOCUMENTS

WO WO 2009/09791 A1 8/2009

OTHER PUBLICATIONS

Swedish Search Report for Patent Application No. 1951188-0 dated Apr. 17, 2020.
Tekscan, *Load Cell v. Force Sensor*, online whitepaper, published Jun. 8, 2019, at https://www.tekscan.com/resources/whitepaper/load-cell-vs-force-sensor, retrieved on Aug. 16, 2021 from https://web.archive.org/web/20190608140604/https://www.tekscan.com/resources/whitepaper/load-cell-vs-force-sensor.

* cited by examiner

*Primary Examiner* — Matthew A Eason
(74) *Attorney, Agent, or Firm* — Knobbe, Martens, Olson & Bear, LLP

(57) ABSTRACT

An in-ear audio listening device comprising a user input element, the user input element comprising a force-sensitive resistor (FSR) and a contact portion configured to receive a user input and, in turn, exert a force upon the FSR, wherein the FSR is configured to detect the force from the contact portion and generate an output for use in controlling operation of an electronic device associated with the in-ear audio listening device.

18 Claims, 17 Drawing Sheets

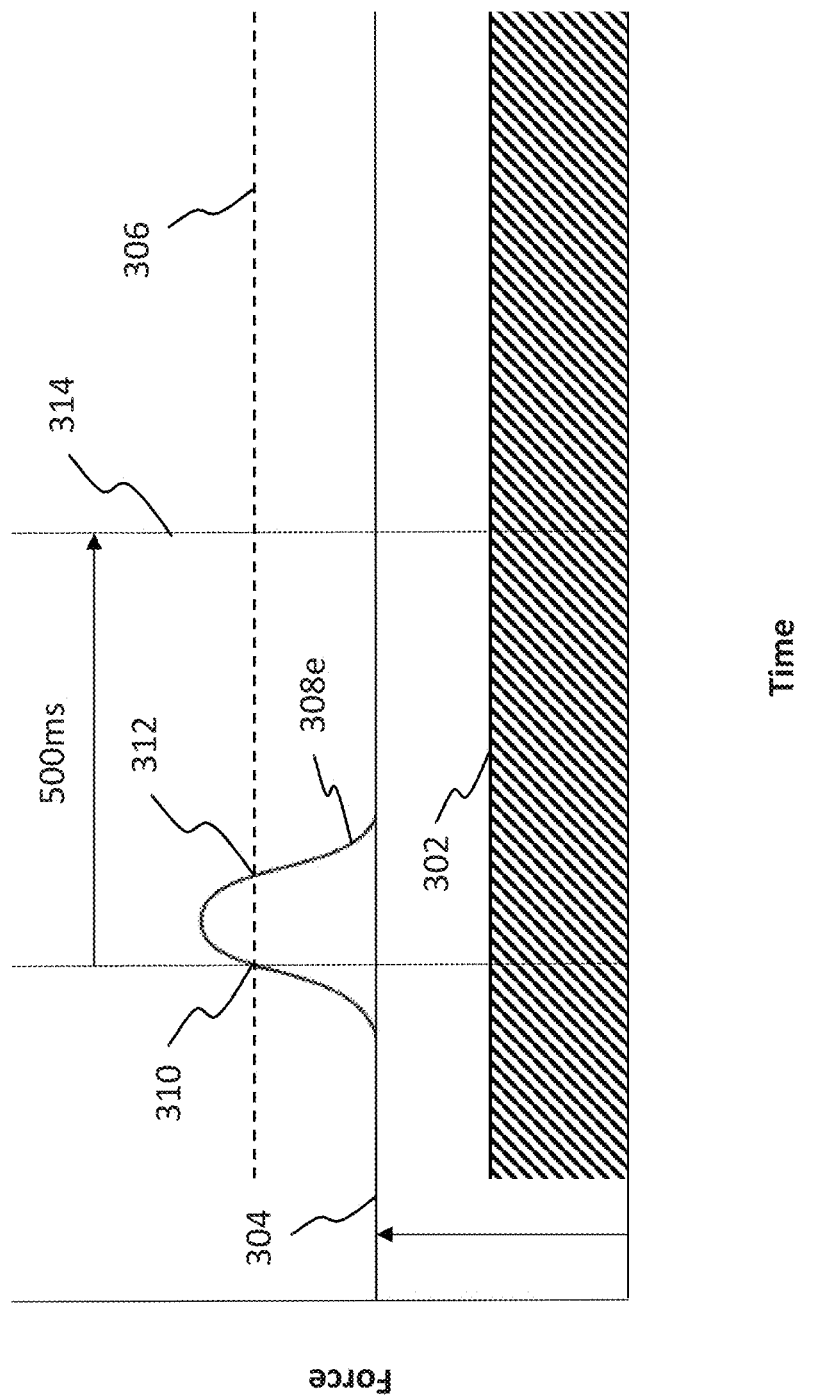

USER INPUT ELEMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present application relates to a user input element for an in-ear audio listening device.

Description of the Related Art

Many users listen to audio, such as music, podcasts and the like, using headphones. The headphones are connected, by a wired or wireless connection, to a playback device that plays back the audio to the user via the headphones. In most applications, the user can interact with the playback device to alter the playback or otherwise control the device. However, in some cases, the headphones themselves have one or more buttons or other input elements with which the user can interact to control the device. There are a number of different options currently used in headphones for detecting user interaction.

The simplest option is a physical button, usually operated by a mechanical tactile switch or dome switch placed on a printed circuit board (PCB). The actuation force for these types of mechanical switch usually starts around 0.8 N to 1.0 N, making them function as push buttons. Another option is a capacitive touch interface, where a PCB or flexible printed circuit (FPC) with printed circuitry in a grid pattern is placed directly beneath the surface of a housing of the headphone. Capacitive touch interfaces have no moving parts, but anything holding an electric charge, for example the finger of a user, will complete the circuit such that an input can be detected. Yet another option is using optical sensors to detect taps. An infra-red (IR) or proximity sensor detects objects that come within a specific distance from the sensor or cover an aperture, thus reducing the amount of light impinging on the sensor. Presence of the object indicates a user input. A further option is to measure vibrations or sounds that are produced from a tap. Accelerometers can measure the movement in certain axes to detect taps, and microphones can identify sounds that correspond to taps to detect such an input. These methods can be combined. For example, an accelerometer or microphone can be used in combination with an optical sensor to reduce false positives.

However, all of these solutions have drawbacks. For in-ear headphone applications, the relatively high actuation forces needed for mechanical switches can cause discomfort in the ear canal when the user pushes the button. Capacitive touch interfaces can mitigate this, but do not function properly when there is not a clean contact, for example if there is water, sweat or dirt on the user's fingers or the input surface, or if the user is wearing gloves, a scarf or a hat. Furthermore, capacitive touch interfaces need to be positioned near the surface of the headphone, which is an area usually required to implement other features, for example an antenna. Implementation of a capacitive touch interface in the same region as an antenna can lead to degradation of radio frequency (RF) performance. Optical sensors are very sensitive to the precise location of a user input, and require certain semi-opaque qualities for the interaction area. In some cases, interference such as clothing or long hair can cause false positives. Accelerometers and/or microphones struggle to distinguish between single taps and double taps, and other movement such as a step can cause false positives.

SUMMARY

It is in view of the above considerations and others that the various embodiments disclosed herein have been made. The present disclosure recognizes the fact that a user input element is required for headphones, in particular in-ear headphones, which mitigates at least some of the drawbacks mentioned in the background.

The devices disclosed in the present application use force-sensitive resistors (FSRs) to implement a user input element that provides advantages over many existing techniques for enabling user interaction with in-ear headphones. FSRs generally have applications in other fields, such as touch sensitive musical instruments or interactive children's toys. FSRs have a relatively low activation force, which is the force applied to an FSR above which an electrical circuit in the FSR is completed and an output signal is provided. This can minimise or even eliminate discomfort associated with interaction with in-ear devices, as a user does not need to press hard on the input element to provide a discernible input. A typical value of the activation force for a suitable FSR is between 0.1 N and 0.2 N. An FSR is capable of detecting a number of different types of user input, such as single or multiple tap commands, and sustained press commands that may be made at different levels of pressure. This enables a number of different combinations of inputs to be mapped to different functions, increasing the range of control that can be provided to the user. A user input element using an FSR can provide an interaction surface for a headphone that can be used with gloves, wet or dirty hands, clothing and long hair. Such an input element can be implemented with only a small footprint, so that space near the surface of a listening device can be saved for other functionality such as antennae, which can reduce any RF interference.

According to an aspect, there is provided an in-ear audio listening device comprising a user input element, the user input element comprising: a force-sensitive resistor (FSR) and a contact portion configured to receive a user input and, in turn, exert a force upon the FSR, wherein the FSR is configured to detect the force from the contact portion and generate an output for use in controlling operation of an electronic device associated with the in-ear audio listening device.

Optionally, the FSR and the contact portion are disposed in a guide portion, and the contact portion comprises a rigid button. Optionally, the contact portion comprises a hinged contact element. Optionally, the contact portion comprises a resilient element. Optionally, when no external force is applied to the contact portion, there is an interference fit between the contact portion and the FSR. Optionally, the interference fit is configured to provide a force to the FSR that is higher than the activation force of the FSR. Optionally, the force provided by the interference fit is considered as a zero-level, such that only external forces are use in generating the output.

Optionally, only user inputs exerting a force on the FSR having an amplitude above a force threshold are used in controlling operation of an electronic device associated with the in-ear audio listening device. Optionally, the force threshold is set relative to a preload force implemented in the user input element. Optionally, only user inputs having a trigger point before a time threshold are used in controlling operation of an electronic device associated with the in-ear audio listening device, wherein the trigger point is the point at which the user input reaches the force threshold. Optionally, a user input having a duration shorter than a first period defined by a first time threshold is considered to be a tap input, wherein the duration is a time difference between a trigger point of the output and a release point of the input, and wherein the release point is the point at which the user input returns below the force threshold. Optionally, a user input having a duration longer than the first period is considered to be a hold input. Optionally, if a first user input is received having a duration shorter than the first period, and a second user input is received having a duration shorter than a second period defined by a second time threshold and having a release point before the second time threshold, the first and second user inputs are considered to be a double tap input. Optionally, if a third user input is received having a duration shorter than a third period defined by a third time threshold and having a release point before the third time threshold, the first user input, second user input and third user input are considered to be a triple tap input. Optionally, the user input comprises at least one tap on the contact portion. Optionally, the user input comprises at least one press or hold on the contact portion.

Optionally, the FSR comprises an electrically conductive element, and at least two electrodes, wherein the electrically conductive element is configured to provide electrically conductive contact between the at least two electrodes when it receives a force higher than the activation force of the FSR. Optionally, the at least two electrodes are configured to be electrically connected to a printed circuit board (PCB). Optionally, the FSR further comprises a flexible printed circuit (FPC), the at least two electrodes are electrically connected to the FPC, and the FPC is configured to be electrically connected to the PCB. Optionally, the at least two electrodes are disposed directly on the PCB. Optionally, the PCB comprises electronics configured to generate a control signal based on the generated output.

Optionally, the user input element further comprises a support element, and the FSR is disposed between the support element and the contact portion. Optionally, the in-ear audio device comprises a housing, and the support element is configured to be connected to the housing. Optionally, the support element is configured to be inserted into a groove of the housing. Optionally, the support element is configured to be connected to the housing using a fastening element. Optionally, the support element is configured to be connected to the PCB. Optionally, the PCB is connected to the housing.

Optionally, controlling operation of an electronic device associated with an in-ear audio listening device comprises at least one of controlling playback of audio from the in-ear audio listening device, activating a sensor, answering or terminating a telephone call, starting or ending tracking of an activity, and enabling a voice assistant.

Optionally, the in-ear audio listening device comprises a loudspeaker for emitting sound signals into the ear of the user.

Also disclosed is a user input element for an in-ear audio listening device, the user input element comprising a force-sensitive resistor (FSR) and a contact portion configured to receive a user input and, in turn, exert a force upon the FSR, wherein the FSR is configured to detect the force from the contact portion and generate an output for use in controlling operation of an electronic device associated with the in-ear audio listening device.

BRIEF DESCRIPTION OF THE DRAWINGS

Exemplary embodiments of the disclosure shall now be described with reference to the drawings in which:

FIG. 3d shows a plot of output voltage against time for a single tap input;

Throughout the description and the drawings, like reference numerals refer to like parts.

DETAILED DESCRIPTION

Figure 1:
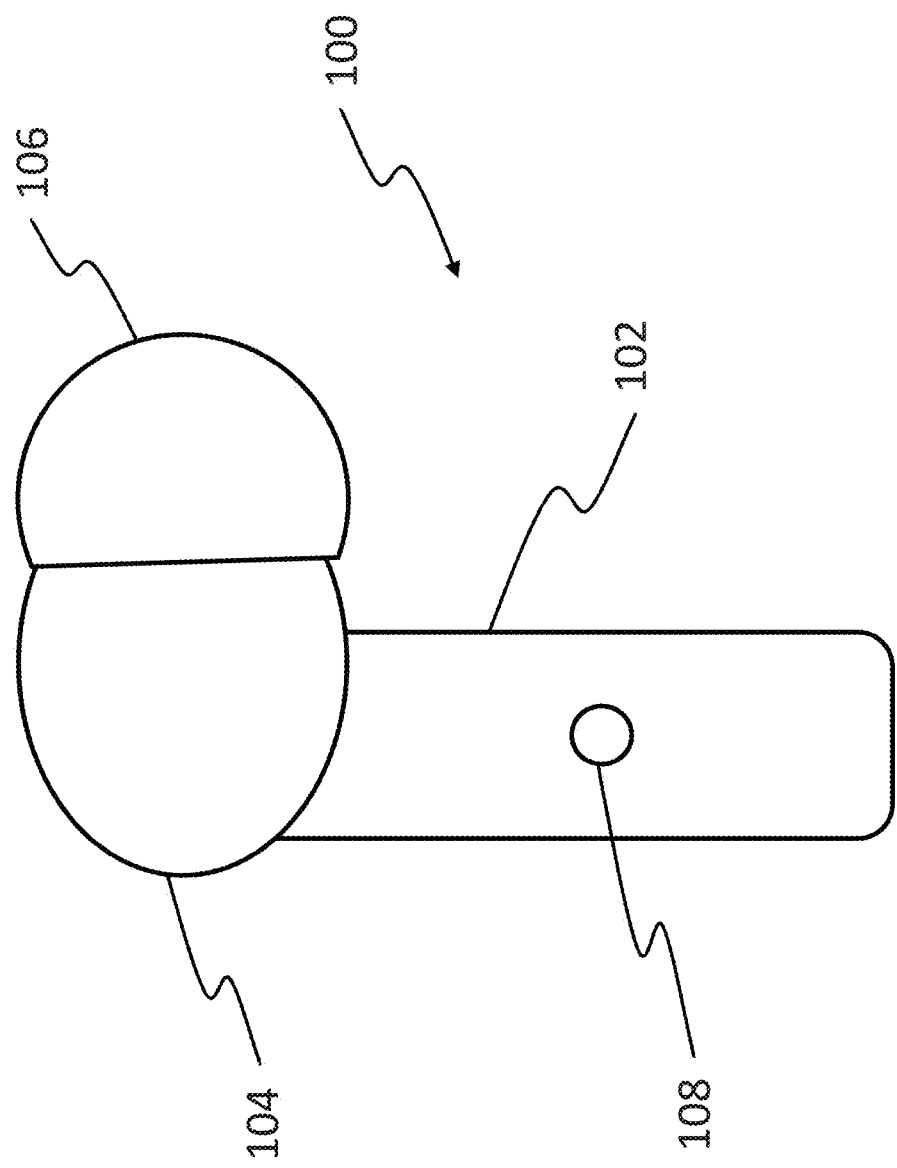
FIG. 1 shows an in-ear audio listening device according to the disclosure.

FIG. 1 shows an embodiment of an in-ear audio listening device 100. The in-ear audio listening device 100 comprises a body portion 102 and a head portion 104. In some embodiments, the body portion 102 and the head portion 104 are formed integrally as a single body. The body portion 102 may comprise electronics for receiving signals from an associated electronic media playback device (not shown) to enable audio to be produced by the in-ear audio listening device 100. The media playback device may be a smartphone, tablet, laptop computer, desktop computer, or any other device capable of controlling audio playback via the in-ear audio listening device 100. The in-ear audio listening device 100 may communicate with the media playback device through a wired or wireless connection. The head portion 104 comprises a sound producing device, for example a speaker, for producing the audio. In some embodiments, the in-ear audio listening device 100 has an ear tip 106 for insertion into the ear of a user. In other embodiments, the ear tip 106 may be absent, and the head portion 104 of the in-ear audio listening device 100 may be inserted directly into the ear of the user.

The in-ear audio listening device 100 may also comprise one more user input elements 108 for enabling a user to interact with the in-ear audio listening device 100 and associated electronic media playback device. The user input element 108 may be implemented as part of the housing of the body portion 102 or the head portion 104 of the in-ear audio listening device 100, rather than on a separate part of a headphone assembly such as any wiring or additional housing structures. The in-ear audio listening device 100 of FIG. 1 has a single user input element, although it will be appreciated that any suitable number of user input elements 108 may be used. Using the user input element 108, the user can provide an input for use in controlling operation of the electronic media playback device. For example, the user may interact with the user input element 108 to control playback of audio from the in-ear audio listening device 100. This can include playback functions such as play, pause, stop, skip forward, skip back, scan forward, scan back, volume up and/or volume down, as well as other known playback functions. Interacting with the user input element 108 may also enable non-playback related functions. Examples of such non-playback related functions include activating a sensor or antenna associated with the in-ear audio listening device 100 or the electronic media playback device, answering or terminating a telephone call, starting or ending tracking of an activity, such as a period of exercise, and/or enabling a voice assistant associated with the in-ear audio listening device 100 or the electronic media playback device.

Current implementations for user input elements for in-ear audio listening devices have many drawbacks, such as causing discomfort, requiring clean contact or specific positioning, being oversensitive to the precise location of a user input, or detecting false positives. The following disclosure describes arrangements for a user input element that mitigate at least some of these drawbacks. This is achieved by providing a user input element that comprises a force-sensitive resistor (FSR).

Figure 2:
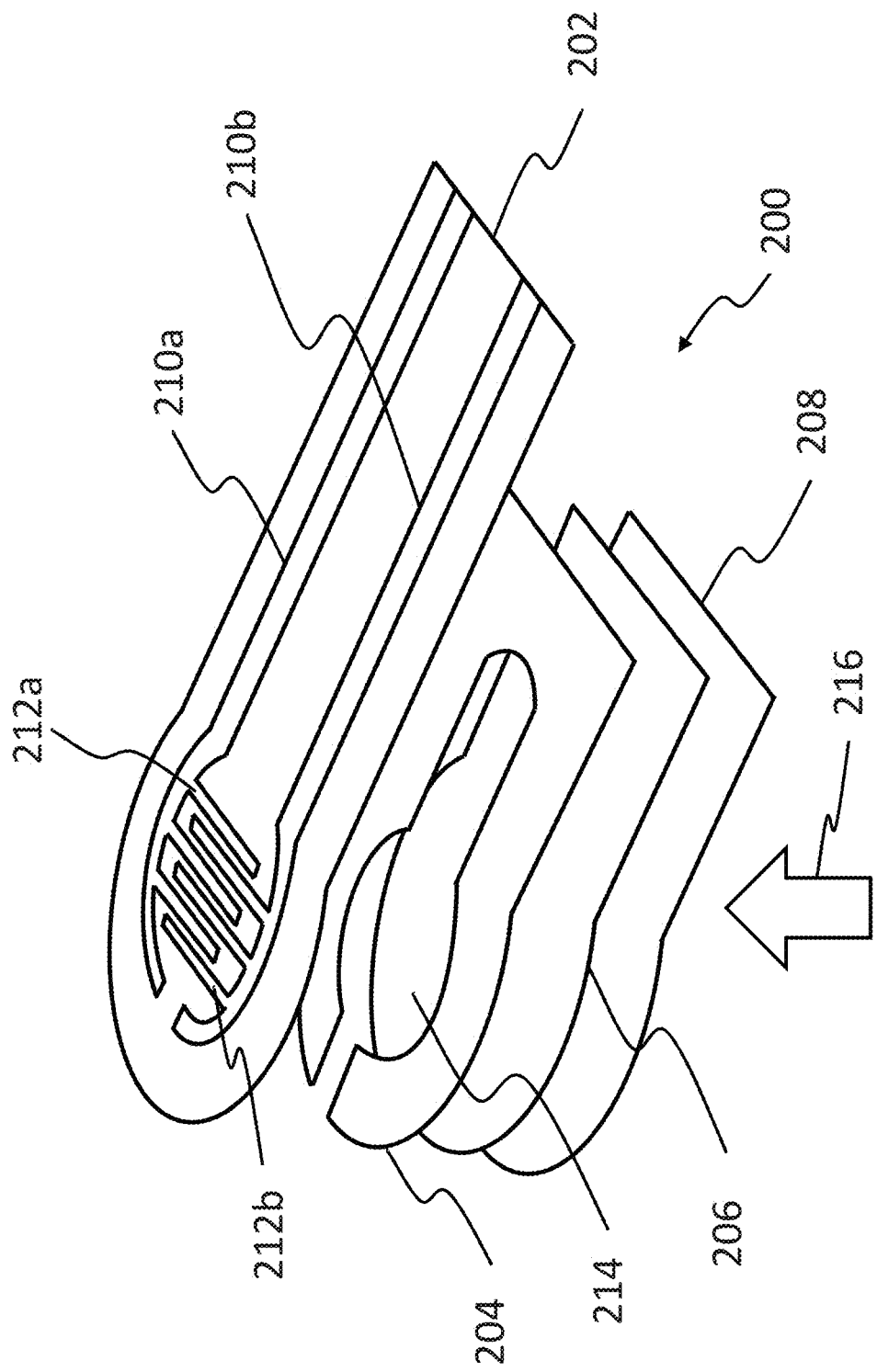
FIG. 2 shows an exploded view of a force-sensitive resistor (FSR) according to the disclosure.

FIG. 2 shows an exploded view of an example FSR 200. The FSR 200 comprises an electrode layer 202, a spacer layer 204 and a conductive layer 206. In some embodiments, the FSR also has a protective layer 208.

The electrode layer 202 comprises two electrodes 210*a-b*. In the example of FIG. 2, each electrode 210*a-b* has a number of legs 212*a-b*, which are disposed in a non-contact arrangement with the legs of the other electrode on the electrode layer 202. As such, there is no electrical contact between the first electrode 210*a* and the second electrode 210*b* when the FSR is in its inactive state. As shown in FIG. 2, the legs 212*a* of the first electrode 210*a* may interlock with the legs 212*b* of the second electrode 212*b*, without being in contact. The electrodes 210*a-b* may be put into electrical contact with a printed circuit board (PCB), which can be used to generate a control signal based on a user input detected by the FSR 200. Whilst two electrodes 210*a-b* are shown in FIG. 2, it will be appreciated that any suitable number of electrodes could be provided on the electrode layer 202.

In some embodiments, the electrode layer 202 is implemented as a flexible printed circuit (FPC). The FPC is then put into electrical contact with the PCB. In cases where standard FPCs are used, this provides a configuration that has minimal tolerance or maintenance issues, and allows FPCs different dimensions to be used for different configurations. In some cases, the FPC may be a polymer thick film (PTF). PTF circuits are particularly well suited to low-power applications. In other embodiments, the electrodes 210*a-b* are printed directly onto the PCB. This can help to save space in the device when a compact design is required.

The spacer layer 204 is disposed adjacent the electrode layer 202. The spacer layer 204 is made of an electrically non-conductive material. The spacer layer 204 has a gap or cut-out 214. In the example of FIG. 2, the gap 214 generally corresponds to the position of the legs 212*a-b* of the electrodes 210*a-b* in the electrode layer 202.

The conductive layer 206 is disposed adjacent the spacer layer 204, on the opposite side of the spacer layer 204 from the electrode layer 202. The conductive layer 206 is made of an electrically conductive material. In some embodiments, the conductive layer comprises a conductive polymer, for example conductive polyethylene.

In some embodiments, the FSR also has a protective layer 208 disposed on the opposite side of the conductive layer 206 to the spacer layer 204. The protective layer may provide a barrier to protect the conductive layer 206 from external contaminants.

When an external force is applied to the FSR 200, in the direction of arrow 216, the conductive layer 206 is pushed towards the electrode layer 202 such that a portion of the conductive layer 206 moves through the gap 214 in the spacer layer 204 and makes contact with the electrode layer 202. In particular, the portion of the conductive layer 206 that moves through the gap 214 makes contact with the legs 212*a* of the first electrode 210*a* and the legs 212*b* of the second electrode 212*b*, thus providing an electrical contact between the first electrode 210*a* and the second electrode 210*b* via the conductive layer 206. This completes a circuit in the FSR 200 which then provides an output signal to, for example, a PCB with which the electrodes 210*a-b* are in electrical contact. When a higher force is applied, an increased area of conductive layer 206 makes contact with the electrode layer 202. This reduces the resistance between the conductive layer 206 and the electrodes 210, which in turn alters the output voltage and/or current of the signal provided to the PCB. By changing the force applied to the FSR 200, different output signals can be provided to the PCB. This increases the number of possible inputs that can be detected by a user input element, and thus allows increased control of the operation of a device with which the user input element is associated.

In some implementations, the FSR 200 may be subject to a preload above the normal activation force of the FSR 200, which ensures that there is always electrical contact between the first electrode 210*a* and the second electrode 210*b*, even when the FSR is in its inactive state. This can be achieved by assembling a user input comprising the FSR such that the conductive layer 206 is always in contact with the first electrode 210*a* and the second electrode 210*b*. As such, the circuit is always complete and an output signal is always produced, even when no external force is applied. Without such a preload, small forces caused by mechanical tolerances within the input element can cause the FSR 200 to output a signal even when no external force is applied, leading to false positives. This issue is mitigated by the presence of a preload above the level of any forces caused by mechanical tolerances. The force provided by the preload can be set as a nominal zero level by software that controls operation of a user input element implementing the FSR 200. Such an implementation means that the effective activation force of the FSR 200 is any force above the preload. This increases the sensitivity of the FSR 200, and ensures that any external inputs to the user input element are properly sensed and processed. The preload can be implemented by constructing the FSR 200 in an appropriate manner, as will be discussed in relation to FIGS. 5*a-c*.

FIGS. 3*a* to 3*g* show how different inputs may be handled by a user input element implementing the FSR. Such a user input element is capable of detecting a discrete tap or a sustained press from the user. Different types of input are therefore easily and intuitively available for a user, for example a single tap, double tap, triple tap, sustained press, double press and/or hold. Different input combinations can be mapped to different functions. The plots in FIGS. 3*a* to 3*g* are not to scale.

Figure 3A:
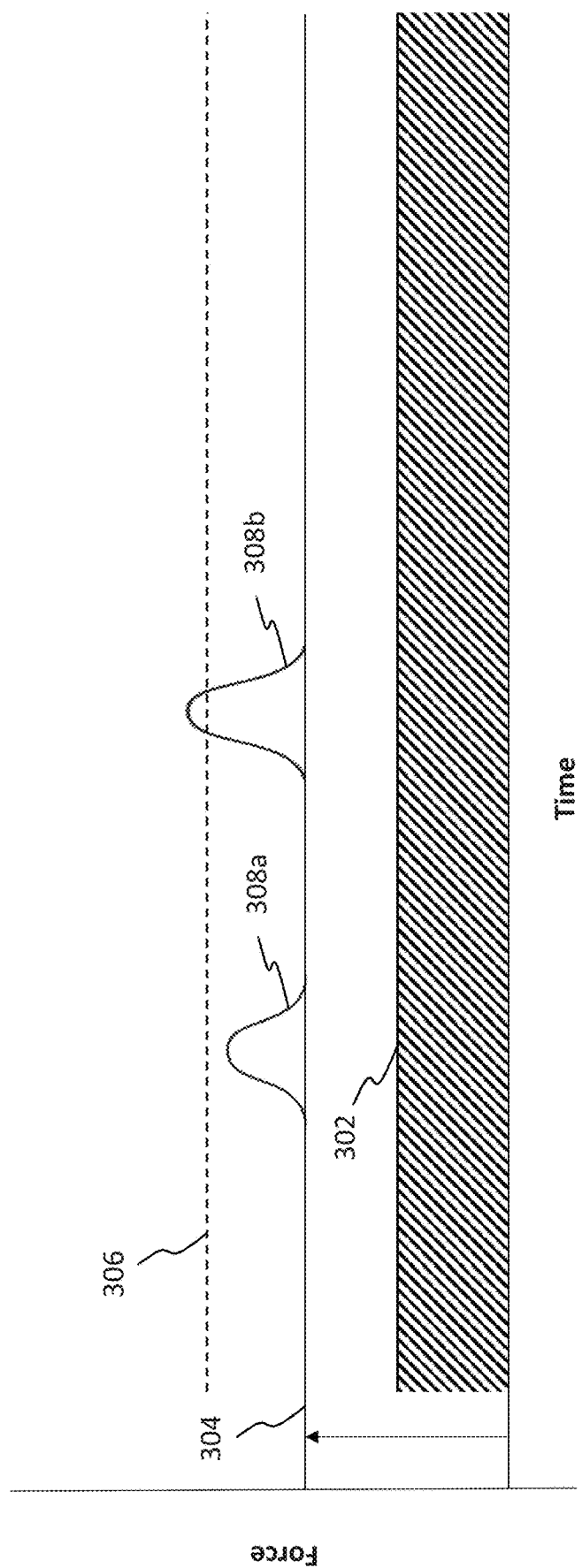
FIG. 3a shows a plot of output voltage against time for a user input element implementing an FSR with a preload and a force threshold.

FIG. 3*a* shows a plot of the output voltage from an FSR against time with two inputs applied to the user input element. The voltage output from the FSR is proportional to the force applied by a user input, and can therefore be considered analogous to the force applied. The FSR of the user input element has an activation force 302 above which the electrical circuit in the FSR is completed and an output signal is provided. The activation force may be between 0.1 N and 0.2 N. As discussed above, the FSR may be implemented with a preload 304 above the activation force of the FSR 200. The preload 304 may be desired to be as low as possible, as long as it is above the activation force 302 of the FSR. As temperature changes can affect the performance of the FSR, the preload 304 can be implemented at a sufficient level to function in both high and low temperature environments. In one example, the preload 304 is set at 0.5 N. The force provided by the preload can be set as a nominal zero input level. Each input is then detected from the zero level set by the preload 304.

In some embodiments, a threshold 306, shown by the dashed line, can also be set such that only input forces determined to be above the threshold 306 will be interpreted as commands. The threshold can be implemented in software that reads the output signal from the FSR. This ensures that small forces that may be caused by events other than a user input are not interpreted as control commands. The threshold may be any suitable value, such as 0.08 N to 0.1 N above the preload 304. A first input 308*a* is shown having a peak value less than the threshold 306. As such, this input is not taken into account for determining a command. A second input 308*b* is shown having a peak value more than the threshold 306. As such, this input may be taken into account for determining a command.

Figure 3B:
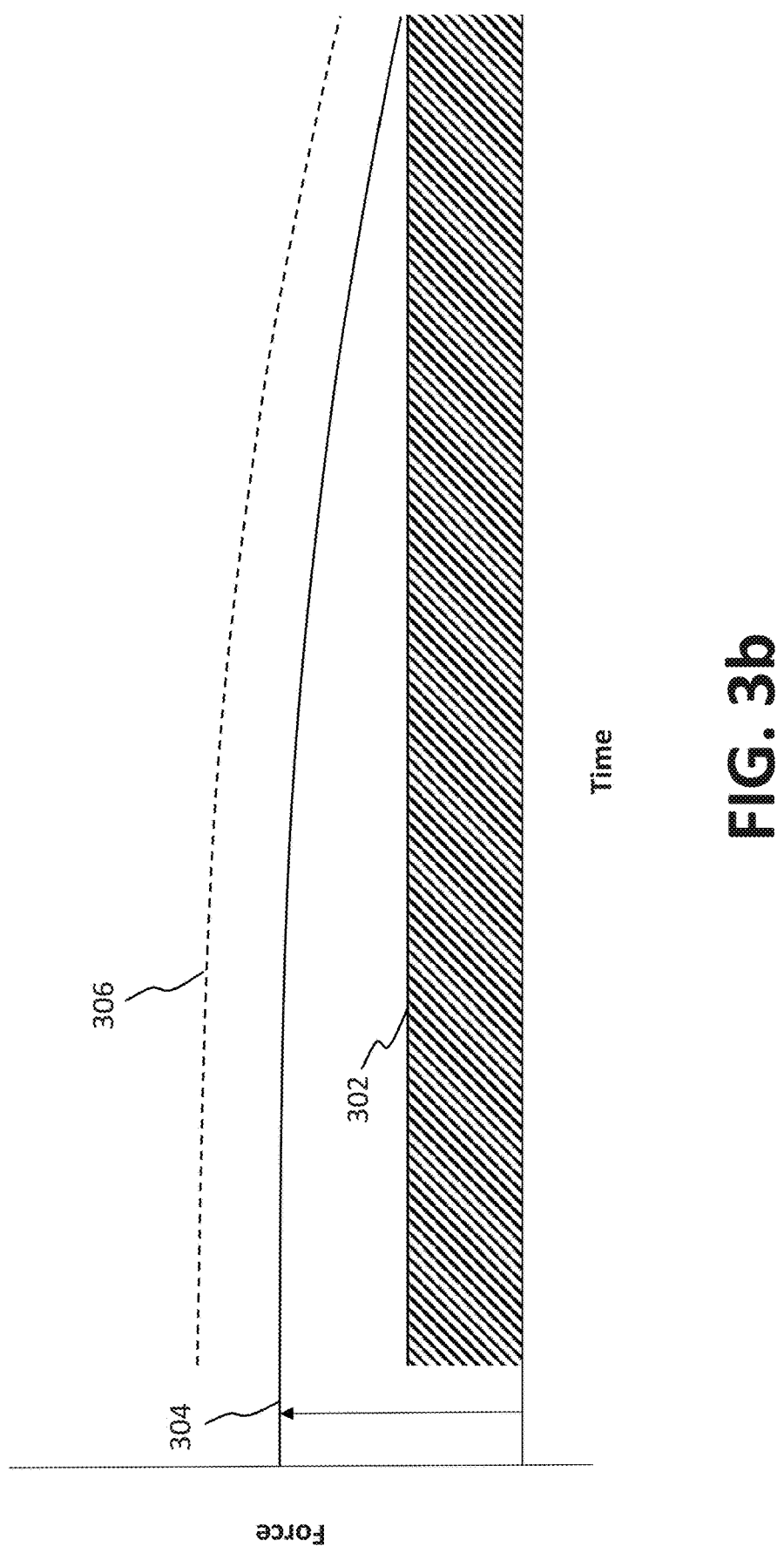
FIG. 3b shows a plot of output voltage against time where the preload changes over time.

FIG. 3*b* shows a plot of output voltage against time where the preload 304 applied to the FSR changes over time. This may occur due to factors such as temperature changes or degradation due to aging. As such, the threshold 306 is implemented in relation to the preload 304, rather than as an absolute value. This can be achieved by analogue or digital filtering implemented in the circuitry that is used with the FSR. In this way, the threshold is always the same in relation to the preload. This means that the force required for a user to make a valid input is consistent over time. The change of the preload over time shown in FIG. 3*b* is an example only, and it will be envisaged that other changes in the preload may occur.

Figure 3C:
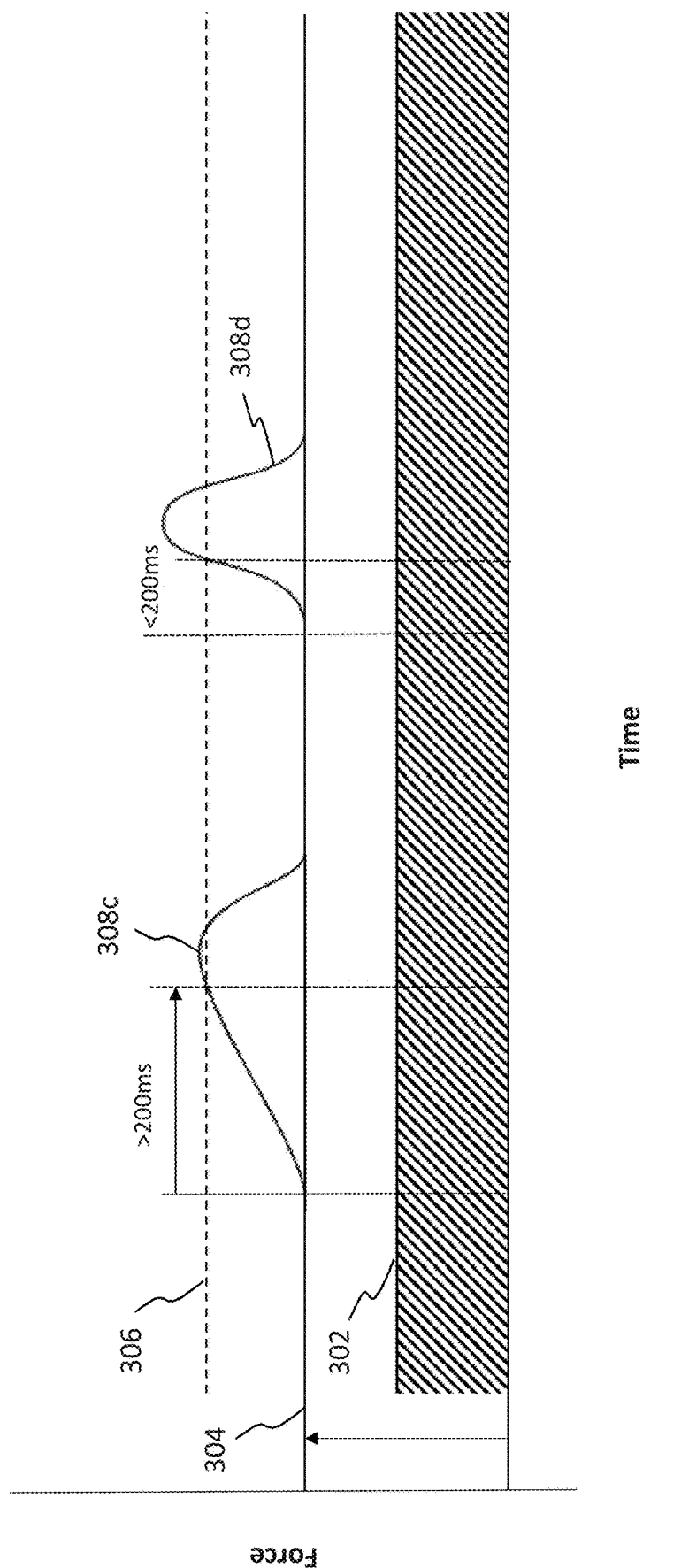
FIG. 3c shows a plot of output voltage against time with an input time threshold.

FIG. 3*c* shows a plot of output voltage against time with two different inputs applied to the user input element. In addition to a force threshold 306, a time threshold (not shown) for detecting an input may also be implemented. The time threshold may be implemented from the initiation of an input (i.e., the point at which a force above the preload 304 is detected). In the example shown in FIG. 3*c*, the time threshold is set at 200 ms from the initiation of an input, although any desired time threshold could be implemented. A first input 308*c* is shown having a peak value above the force threshold 306. However, the point at which the first input 308*c* reaches the force threshold 306 (also referred to as the trigger point of the first input 308*c*) is more than 200 ms after the initiation of the first input 308*c*, i.e., after the time threshold. As such, this input is not taken into account for determining a command. A second input 308*d* is shown having a peak value above the force threshold 306, and the point at which the second input 308*d* reaches the force threshold 306 is less than 200 ms after the initiation of the second input 308*d* i.e., before the time threshold. As such, this input may be taken into account for determining a command. By taking this approach, slow changes to the input force are not taken into account.

FIG. 3*d* shows a plot of output voltage against time with a single input 308*e* applied to the user input element. The input 308*e* has a peak force that is above the force threshold 306. Whilst not shown, the input 308*e* reaches the force threshold 306 less than 200 ms after its initiation. As such, this input may be taken into account for determining a command. The point 310 at which the force of the input 308*e* reaches the force threshold 306 can be called the trigger point. The point 312 at which the force of the input goes back below the force threshold 306 can be called the release point. The time difference between the trigger point 310 and the release point 312 can be used to determine the type of input (i.e., tap input, sustained press or hold). A tap detection threshold 314 can be implemented to determine whether an input is a tap or a sustained press. The tap detection threshold 314 is measured from the trigger point 310 of an input. In this case, the tap detection threshold 314 is 500 ms, although any suitable period could be used. If the time difference between the trigger point 310 and the release point 312 is less than the tap detection threshold 314, then the input may be classified as a tap input. In the example of FIG. 3*d*, the release point 312 is less than 500 ms after the trigger point 310 of the input 308*e*. As such, the input 308*e* is classified as a tap. As no further inputs are detected, the input 308*e* is classified as a single tap. The single tap can then be mapped to an associated command. For example, a single tap may map to a play/pause function, a skip song function, a previous song function, or an on/off toggle for various features of a playback device. Other possible commands will be readily envisaged. If the time difference between the trigger point 310 and the release point 312 is more than the tap detection threshold 314, then the input may be classified as a sustained press or a hold (as shown in FIG. 3*g*).

Figure 3E:
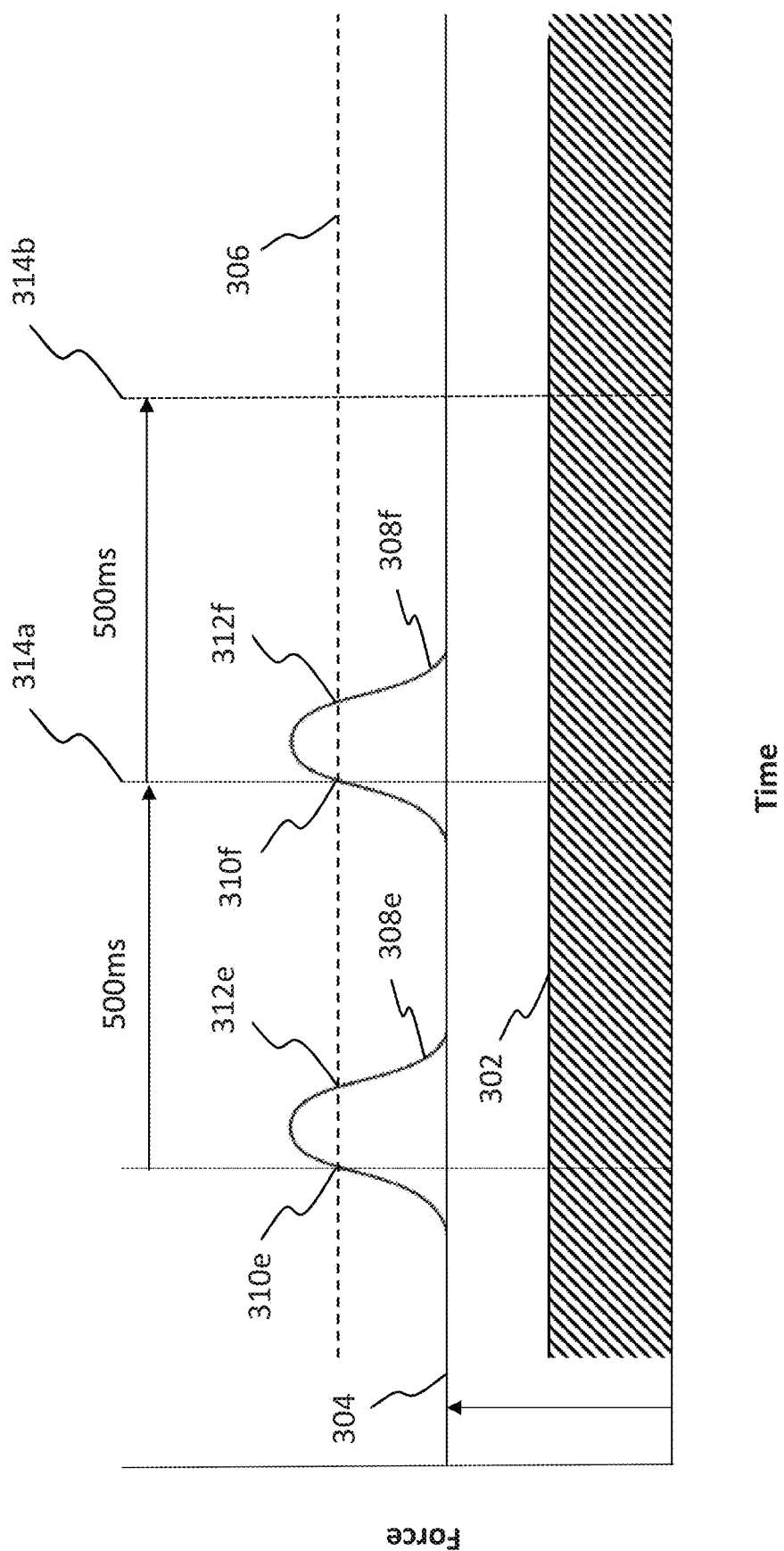
FIG. 3e shows a plot of output voltage against time for a double tap input.

FIG. 3*e* shows a plot of output voltage against time with two inputs applied to the user input element. The first input 308*e* has a trigger point 310*e* and a release point 312*e*, and is a tap input, as described in relation to FIG. 3*d*. After a period defined by the first tap detection threshold 314*a* (initiated by the trigger point 310*e* of the first input 308*e*), a second tap detection threshold 314*b* is implemented to detect any further taps that may be considered in tandem with the first input 308*e*. In some examples, the second tap detection threshold 314*b* could be implemented from the release point 312*e* of the first input 308*e*, or from any suitable point after that. In this example, the second tap detection threshold 314*b* is also 500 ms, although any suitable period could be used. In the example shown in FIG. 3*e*, a second input 308*f* is detected before the second tap detection threshold 314*b*. The second input 308*f* has a trigger point 310*f* and a release point 312*f*. The second input 308*f* is classified as a tap input in the same way as the first input 308*e*. As both the first input 308*e* and the second input 308*f* are classified as tap inputs, and the second input 308*f* is within the period defined by the second tap detection threshold 314*b*, the inputs can be considered in tandem. As no further inputs are detected, the first input 308*e* and the second input 308*f* are classified as a double tap input. A double tap may be mapped to a different command from a single tap. For example, a double tap may map to a stop function. In an example where the second input 308*f* was made after the further tap detection period defined by the second tap detection threshold 314*b*, the inputs would be considered as two separate single tap inputs and mapped to distinct commands.

Figure 3F:
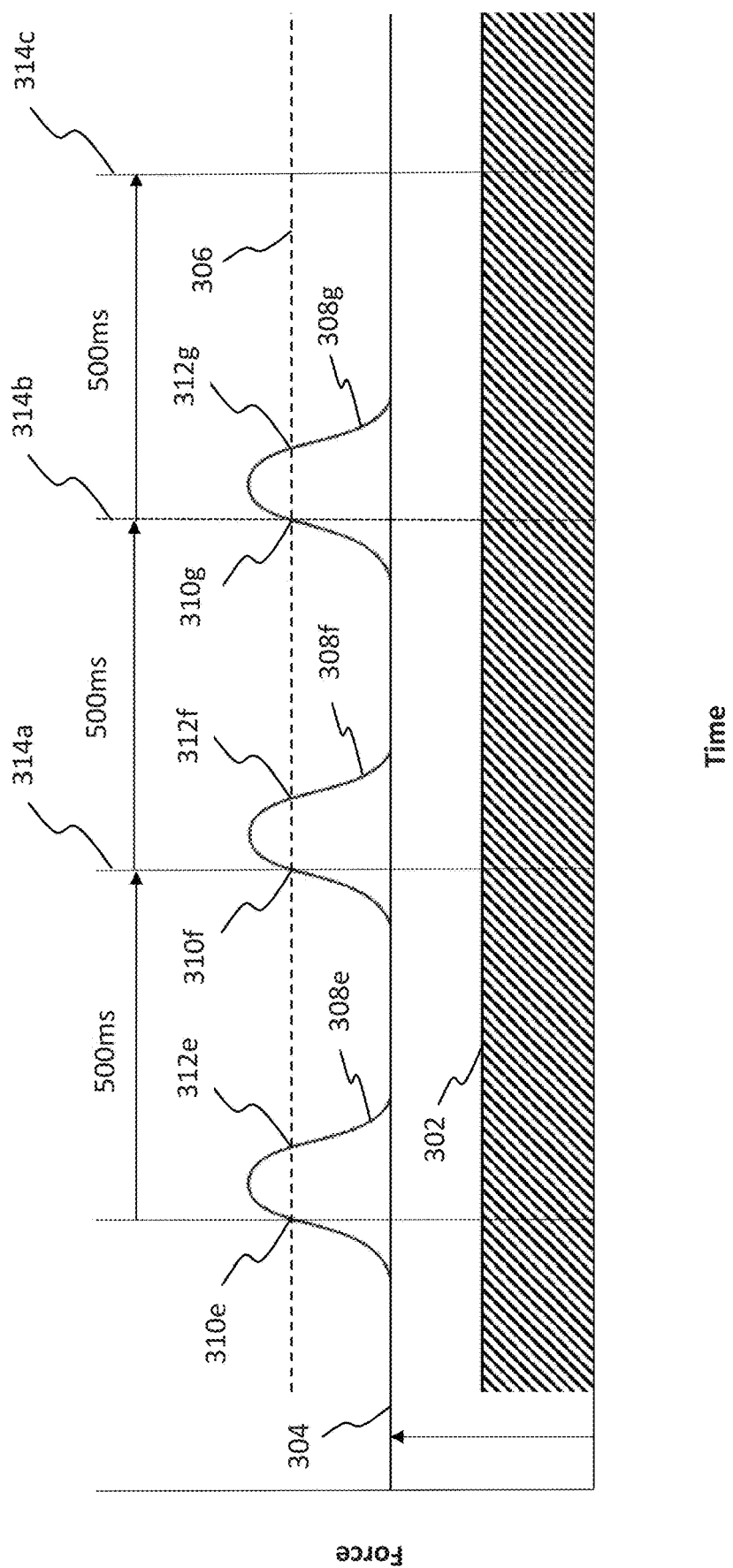
FIG. 3f shows a plot of output voltage against time for a triple tap input.
Figure 3G:
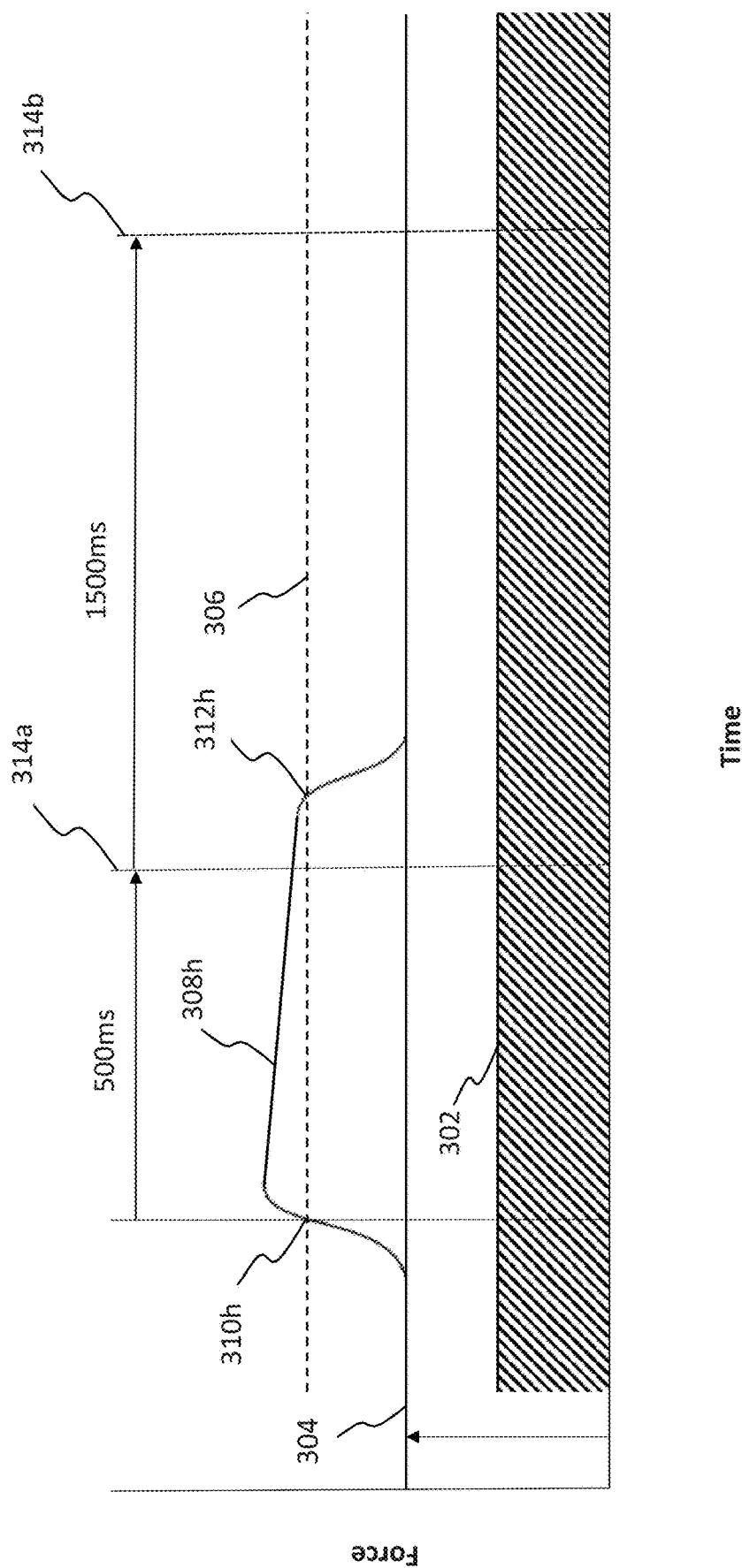
FIG. 3g shows a plot of output voltage against time for a sustained press input.

FIG. 3*f* shows a plot of output voltage against time with three inputs applied to the user input element. The first and second inputs 308*e*, 308*f* are the same as those shown in FIG. 3*e*. In addition, a third input 308*g* is shown. The third input 308*g* has a trigger point 310*g* and a release point 312*g*. Similarly to the double tap detection described in FIG. 3*e*, a third tap detection threshold 314*c* is applied after the period defined by the second tap detection threshold 314*b*. In this example, the third tap detection threshold 314*c* is also 500 ms, although any suitable period could be used. In the example shown in FIG. 3*f*, the release point 312*g* of the third input 308*g* is detected before the third tap detection threshold 314*c*. The third input 308*g* is classified as a tap input in the same way as the first input 308*e* and the second input 308*f*. As the first input 308*e*, the second input 308*f* and the third input 308*g* are all classified as tap inputs, and each was made within the tap detection period defined by the previous input, the inputs can be considered in tandem. As no further inputs are detected, the first input 308*e*, the second input 308*f* and the third input 308*g* are classified as a triple tap input. A triple tap may be mapped to a different command from a single tap and/or a double tap. In an example where the third input 308*g* was made after the further tap detection period defined by the third tap detection threshold 314*c*, the first and second inputs 308*e*, 308*f* would be considered as a double tap input, and the third input 308*g* as a single tap input. These inputs would be considered separately and mapped to distinct commands.

It will be appreciated that further tap detection thresholds could be implemented to group together as many multiple tap inputs as desired, for example quadruple, quintuple tap inputs and so on.

FIG. 3*g* shows a plot of output voltage against time with a single input 308*h* applied to the user input element. The input 308*h* has a trigger point 310*h* and a release point 312*h*. In this case, the release point 312*h* is after a tap detection threshold 314*a*. As such, the input 308*h* is not classified as a tap. Instead, the input 308*h* is classified as a sustained press or a hold. In some embodiments, anything longer than a tap is considered as a hold input. In other embodiments, an input longer than a tap, but not long enough to be considered a hold may be differentiated. Such an input can be called a sustained press. Different criteria can be applied to determine whether the input 308*h* is a sustained press or a hold. In this case, a hold detection threshold 314*b* is applied after the tap detection threshold 314*a*. As the release point 312*h* of the input 308*h* is between the tap detection threshold 314*a* and the hold detection threshold 314*b*, it can be classified as a sustained press. If the release point 312*h* was after the hold detection threshold 314*b*, the input 308*h* would be classified as a hold input. No further detection thresholds are implemented after the hold detection threshold 314*b*. The hold detection threshold 314*b* in FIG. 3*g* is shown as being 1500 ms after the tap detection threshold 314*a*, although any suitable value could be used. It will be appreciated that in embodiments where only taps and holds are distinguished, the tap detection threshold 314*a* and the hold detection threshold 314*b* would be at the same point. It will be appreciated that other combinations of thresholds could be used to determine between a tap, a sustained press, a hold or other types of input. A sustained press or a hold may be mapped to the same or different types of command from tap inputs. For example, a sustained press or hold input could be mapped to binary commands such as a play/pause function in the same way as a tap input. However, a sustained press or hold input could also be used for non-binary commands where tap events can be difficult to use, for example a continuously increasing/decreasing volume feature. In some embodiments, a sustained press or hold input could be used for a power on/off command for an in-ear audio listening device 100.

In the embodiments shown in FIGS. 3*a-g*, a single force threshold level can be used to determine all different commands. In some embodiments, multiple different thresholds could be used and related to different commands, such that an input can be interpreted as one or more functions depending on the force applied. For example, the user input element may be capable of detecting a variation in pressure between inputs. A low-pressure input (below a first pressure threshold) may map to a volume down function. A medium pressure input (between the first pressure threshold and a second pressure threshold) may map to a volume up function. A high-pressure input (above the second pressure threshold) may map to a power down function. This may be implemented in particular with sustained press inputs.

The input-command mappings discussed above are mere examples, and the skilled person will appreciate that other mappings between inputs and functions, using different combinations of pressure thresholds, may be implemented. Other functions that are not related to audio playback may also be enabled. For example, an input could be mapped to activation of a sensor associated with an in-ear audio listening device or an associated device. Similarly, an input could be mapped to answering or terminating a telephone call, starting or ending tracking of an activity, such as a period of exercise, and/or enabling a voice assistant associated with an in-ear audio listening device or an associated device. The ability to map different combinations of inputs to different functions increases the range of control that can be provided to the user. It will be readily envisaged that other combinations of one or more inputs may be mapped to different combinations of functions.

Figure 4A:
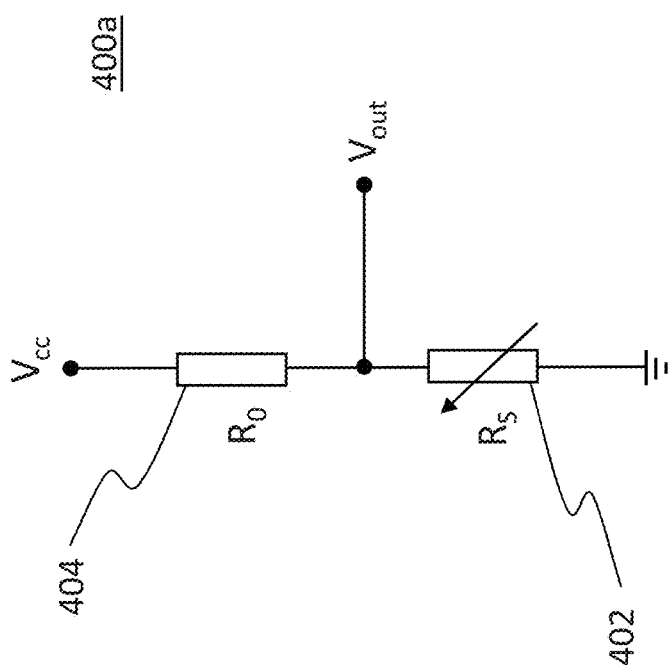
FIG. 4a schematically illustrates a first electrical circuit arrangement for implementing an FSR.
Figure 4B:
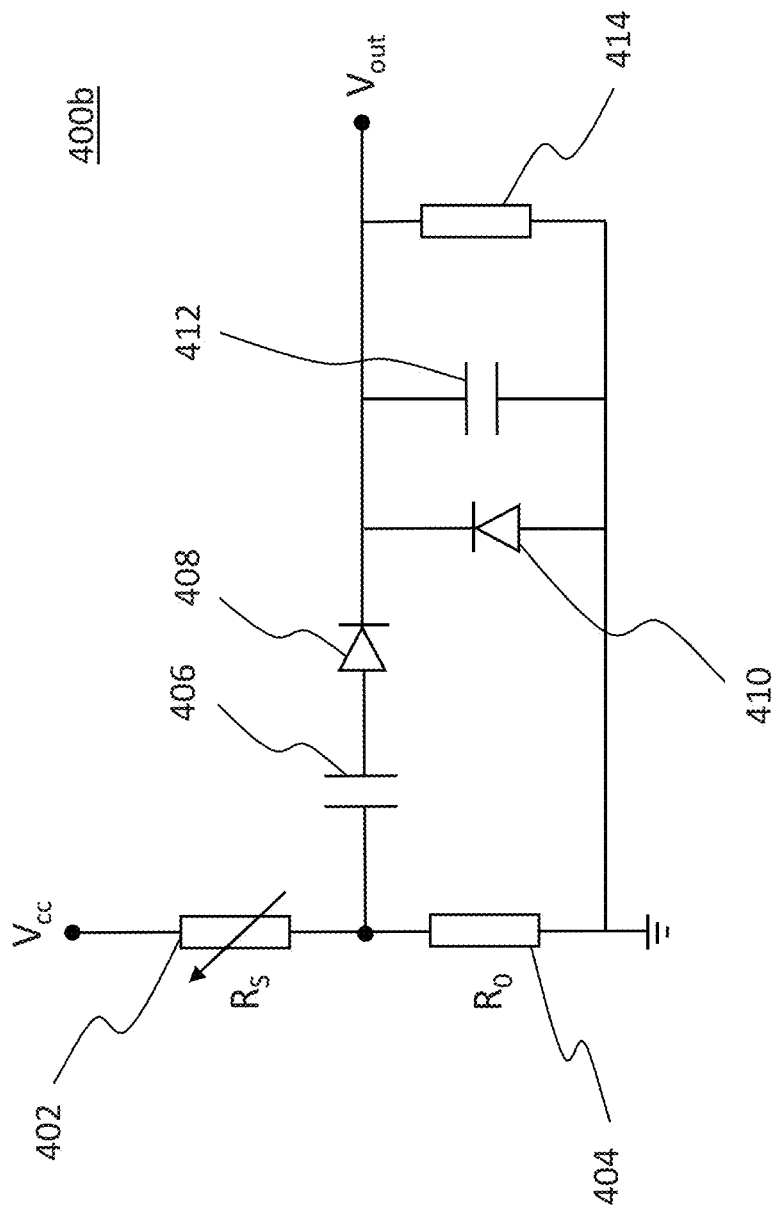
FIG. 4b schematically illustrates a second electrical circuit arrangement for implementing an FSR.

As discussed above, when a force is applied to an FSR, the resistance across the FSR is reduced, which in turn alters the output voltage and/or current of the signal provided to the PCB. However, the relationship between force and resistance is not always linear. As such, the relationship between applied force and output voltage is also not linear. For implementation in a user input element, it may be desired that the relationship between applied force and output voltage be as linear as possible. This ensures that the relationship between the preload and the trigger point for an input remains constant. This can be achieved by a proper implementation of electrical circuitry. FIGS. 4*a-b* schematically illustrate electrical circuit arrangements for implementing an FSR in a user input element.

FIG. 4*a* schematically illustrates a first electrical circuit arrangement 400*a* for implementing an FSR. The circuit arrangement 400*a* is in the form of a voltage divider, having an input voltage $V_{cc}$ and an output voltage $V_{out}$. The input voltage $V_{cc}$ may be supplied, for example, from a battery and is set relative to ground. The circuit arrangement 400a comprises a variable resistor 402, in this case an FSR as described above, having a variable resistance $R_S$. The circuit arrangement 400a also comprises a resistor 404 having a known resistance $R_0$ connected in series with the FSR 402. When a user input is made that reduces the resistance $R_S$ of the FSR 402, the associated change in output voltage $V_{out}$ can be transmitted for interpretation as an input command. The circuit arrangement 400a shown in FIG. 4a will provide a negative output voltage $V_{out}$. The arrangement of the resistors 402, 404 could be reversed to provide a positive output voltage $V_{out}$.

As discussed above, it is desired that the relationship between force applied to the FSR and the output voltage $V_{out}$ be as linear as possible. It has been found that this can be achieved by properly selecting the resistance $R_0$ of the resistor 404. As discussed above, the force applied to the FSR may include both a preload and a user input. As such, the optimal value of $R_0$ may be dependent on the preload. In general, reducing the value of $R_0$ increases the linearity between applied force and output voltage $V_{out}$. However, this also reduces absolute value of the output voltage $V_{out}$. Therefore, a balance should be struck between having a linear relationship between applied force and output voltage $V_{out}$ and having a sufficiently high output voltage $V_{out}$ for interpretation as a command.

Once the value of $R_0$ has been set, the relationship between force applied to the FSR and the output voltage $V_{out}$ can be plotted. Furthermore, the difference between the output voltages for different values of applied force can be determined. If the relationship between force applied to the FSR and the output voltage $V_{out}$ is linear, the difference between the output voltages for incremental changes in the applied force will always be the same. In the case that the relationship is non-linear, it can be uploaded to a Bluetooth (BT) chip or a microcontroller unit (MCU) of the PCB. In this way, the applied force can be related to the correct trigger level. If the upload location is the BT chip, and the MCU can get information and data from the BT chip, it becomes possible to change and/or update threshold values, timers and reference curves wirelessly.

FIG. 4b schematically illustrates a second electrical circuit arrangement 400b for implementing an FSR. The circuit arrangement 400b generates a positive output voltage $V_{out}$ when the FSR is pressed that then slowly fades down to zero. Whereas the circuit arrangement 400a simply converts from resistance to voltage, the circuit arrangement 400b is an analogue implementation example that requires a less complex MCU implementation.

The circuit arrangement 400b comprises a voltage divider, having an input voltage $V_{cc}$, an FSR 402 having a variable resistance $R_S$ and a resistor 404 having a known resistance $R_0$. The input voltage $V_{cc}$ may be supplied, for example, from a battery and is set relative to ground. The arrangement of the resistors 402, 404 is reversed with respect to that shown in FIG. 4a, such that the voltage output from the voltage divider is positive.

Rather than simply providing the voltage output from the voltage divider as a signal for interpretation as an input command, the output is passed through a first capacitor 406 and a first diode 408. The first capacitor 406 acts to AC-couple the circuit 400b, such that only press or release of the FSR is detected, as opposed to slower changes in resistance that come from temperature variations and aging. The first diode 408 acts to rectify the circuit 400b, so that only presses of the FSR are taken into account and no negative voltage signals are produced.

The circuit arrangement 400b further comprises a second diode 410, a second capacitor 412 and a third resistor 414 connected in parallel to the first capacitor 406 and the first diode 408. The second diode 410 is optionally included to ensure that the output voltage $V_{out}$ is always positive. The second capacitor 412 and third resistor 414 act in tandem to determine the timing of the circuit 400b, that is to say how long it takes before the circuit 400b is discharged after a button press. The capacitance value of the second capacitor 412 determines how long it takes to charge, and the resistance value of the third resistor 414 determines how long it takes for the second capacitor 412 to discharge. A smaller capacitance of the second capacitor 412 provides a longer charge, and vice versa. A smaller resistance of the third resistor 414 provides a faster discharge, and vice versa. These values can be set to determine how long a hold input needs to be before it is registered, i.e., a larger capacitance means a hold input must be held for longer. The value can be set to determine how long after a first tap a user must wait before making another tap, which can effect double and triple tap registration. A larger resistance means that the circuit 400b discharges more slowly after a tap release, and so a second tap input can be detected sooner.

In reality, the output signals provided by an FSR may not be as smooth as the inputs shown in FIGS. 3a-g. For example, the time from the initiation of an input to the trigger point tends to be much shorter than the time between the peak value and the release point. In many cases, the time from the initiation of an input to the trigger point for a tap input can be as low as 2 ms, meaning that the sampling rate for an FSR needs to be less than 2 ms for detecting taps. Furthermore, in some cases that signal can include noise, in particular in the period immediately after a tap. To mitigate this, some sort of smoothing or filtering could be applied to the signal. To achieve this, filtering circuitry could be added to either of the circuit arrangements 400a, 400b disclosed above, in order to provide the filtering of the voltage signal. For example, a low-pass filter can be used to filter out noise in the output voltage signal. A high-pass filter, such as the first capacitor 406, can be used to avoid any false triggering due to aging or change in ambient temperature. Another approach is to stop sampling for 50 ms after the release point. This has been found to be the period where the noise in the signal is most prevalent. After a period of 50 ms without sampling, the FSR may start sampling again, listening for a second tap within the tap detection threshold.

The FSR and its associated circuitry can then be implemented in a user input element. Arrangements for a user input element comprising an FSR are described in relation to the following figures. Whilst the disclosed user input elements are particularly suited to in-ear audio listening devices, it will be appreciated that such arrangements would also be applicable for other headphone arrangements, such as over-ear headphones.

Figure 5A:
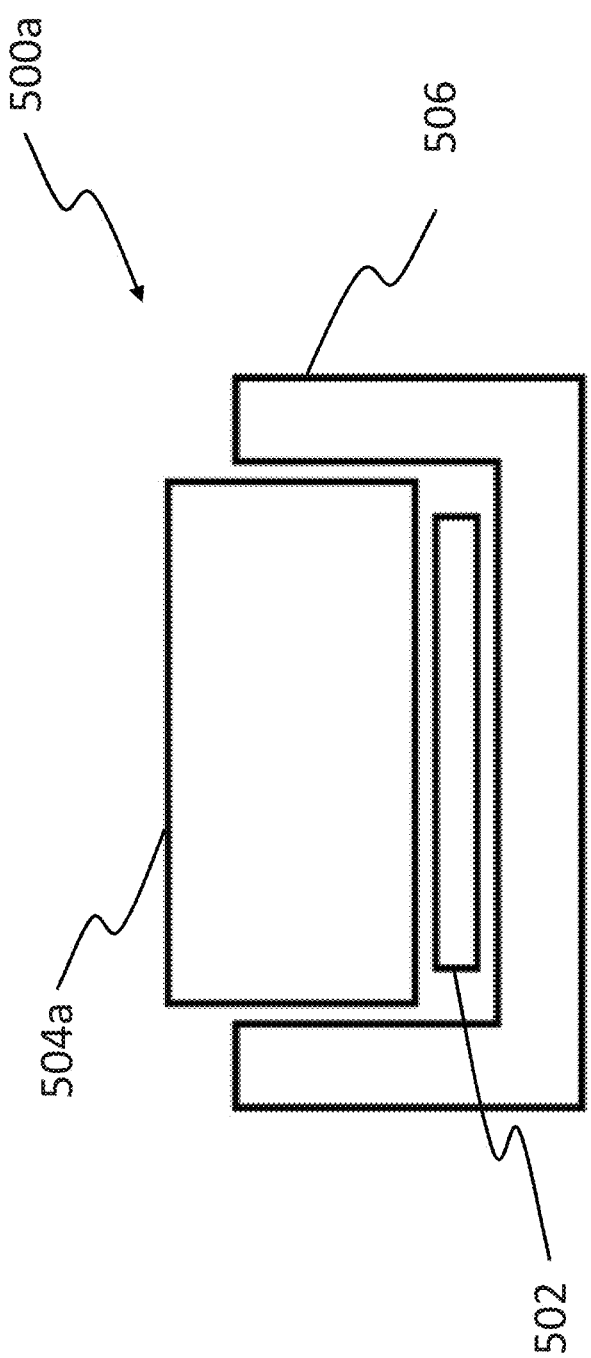
FIG. 5a schematically shows a first arrangement of a user input element according to the disclosure.
Figure 5B:
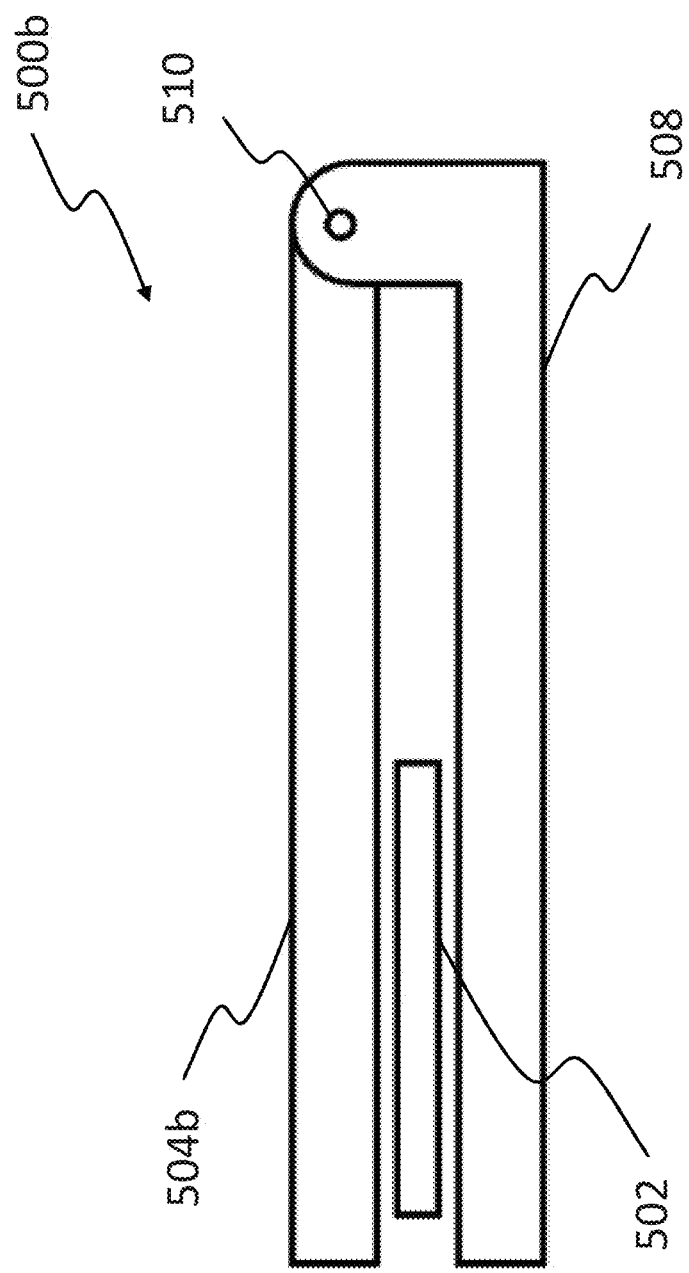
FIG. 5b schematically shows a second arrangement of a user input element according to the disclosure.
Figure 5C:
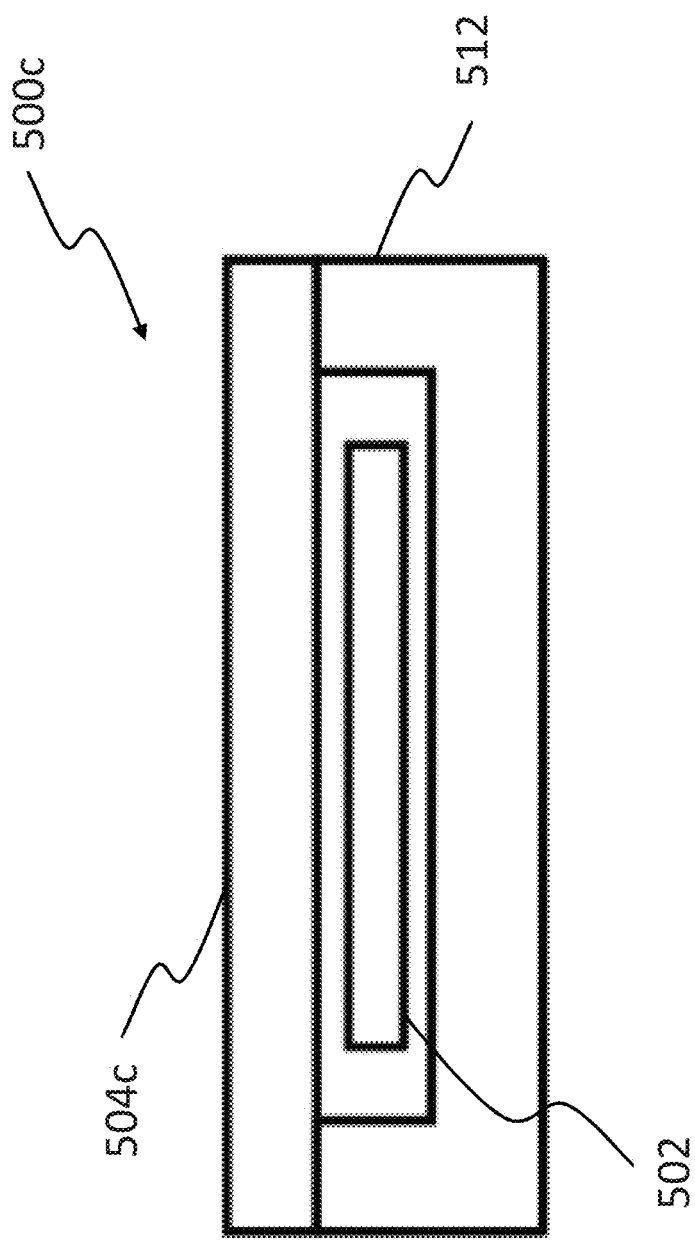
FIG. 5c schematically shows a third arrangement of a user input element according to the disclosure.

FIGS. 5a-c schematically illustrate different arrangements of a user input element 500, for example for use as a user input element 108 of the in-ear audio listening device 100 shown in FIG. 1. Each of the different arrangements comprises an FSR 502, such as the FSR 200. Each of the different arrangements also comprises a contact portion 504. The contact portion 504 is configured to receive a user input and, in turn, exert a force upon the FSR 502. That is to say, in response to receiving a user input such as a tap or press, the contact portion moves into contact with the FSR 502. As described in relation to FIG. 2, when a force is provided that is above an activation force of the FSR 502, the contact between the FSR 502 and the contact portion 504 causes an electrical circuit in the FSR 502 to be completed, and thus an output signal is provided. In this way, a user input can be detected by the user input element 500. In embodiments in which a preload defining a zero level is applied to the FSR 502, any additional force can be considered as an effective activation force of the FSR 502 as the circuit is always complete, thus increasing the sensitivity of the FSR 502. In these instances, the contact portion provides further contact with the FSR 502 in response to receiving a user input.

FIG. 5a shows a first arrangement 500a of a user input element. In this arrangement, the FSR 502 and the contact portion 504a are disposed in a guide portion 506. The FSR 502 is disposed between the contact portion 504a and a bottom part of the guide portion 506. The guide portion 506 ensures that lateral movement of the contact portion 504a is restricted, thus ensuring a reliable contact between the contact portion 504a and the FSR 502 when the user taps or presses the contact portion 504a. In some embodiments, the contact portion 504a is a rigid button. The first arrangement 500a of a user input element may therefore function in the manner of a push button.

FIG. 5b shows a second arrangement 500b of a user input element. In this arrangement, a contact portion 504b is connected to a base portion 508 by a hinged connection 510. The FSR 502 is disposed between the contact portion 504b and the base portion 508. When the user taps or presses the contact portion 504b, the contact portion is pushed down and moves about the hinged connection 510, making contact with the FSR. The FSR 502 is positioned at a suitable distance from the hinged connection 510 for the FSR 502 to provide an output signal when the user taps or presses the contact portion 504b.

FIG. 5c shows a third arrangement 500c of a user input element. In this arrangement, the contact portion 504c is a resilient element. The FSR 502 is disposed between the resilient contact portion 504c and a base portion 512. When the user taps or presses the resilient contact portion 504c, it is compressed and makes contact with the FSR 502. When the user stops pressing the resilient contact portion 504c, it returns to its original shape and position. Such an arrangement can be implemented with the contact portion 504c at the surface of an in-ear audio listening device 100, and the other components further down in the structure. This provides more space directly beneath the surface of an in-ear audio listening device for other elements that are advantageously placed in such a location, such as antennae. In some embodiments, the resilient contact portion 504c and the base portion 512 can be formed integrally, so that the input element 500c is sealed. This provides a more secure configuration that is less susceptible to contaminants such as water or dust.

The particular hardness of the material used for the resilient contact portion 504c may be selected dependent on the desired application. A softer material may detect a user input more accurately over a wider range of tolerances, as a softer material is easier to compress and therefore more likely to generate a larger change in resistance from the FSR 502. When user input elements are assembled, there will be a difference between units in how much the FSR is preloaded. Using a softer material might be advantageous in that a larger change in resistance would be generated when the FSR is pressed. However, use of a softer material may result in false positives during, for example, a user putting the listening device into their ear. A harder material will provide a smaller change in resistance when pressed with the same force compared to a softer material, but is not as sensitive to external forces and thus may detect fewer false positives.

In any of the implementations shown in FIGS. 5a-c, the FSR 502 may be subject to a preload above the normal activation force of the FSR 200, as discussed above. This can be achieved by assembling the contact portion 504 and the FSR 502 such that there is an interference fit between them. As such, the contact portion 504 and the FSR 502 are in contact even when no external force is applied to the contact portion 504. In some embodiments, the interference fit provides a force that is detectable by the FSR 502, i.e., a force above the activation force of the FSR 502. This force, and the resultant output signal, can be set as a nominal zero level by the software that controls operation of the user input element 500, such that only output signals generated when an additional external force is provided to the user input element 500 are used for generating control commands. This ensures that small forces caused by mechanical tolerances within the input element are not taken into account when sensing an input. This may simplify the assembly of the FSR 502, as precise interference fits need not be implemented. In other embodiments, the force provided by the interference fit may be less than the activation force of the FSR 502. In this case, an output signal may only be generated when an external force is provided that, in combination with the force provided by the interference fit, is more than the activation force of the FSR 502.

As discussed above, when a user makes an input to a user input element comprising an FSR that is above an activation force of the FSR, an output signal is generated via the electrodes of the FSR. The electrodes can be electrically connected to a PCB, which comprises electronics for generating a control signal based on the detected user input. The electronics may comprise a Bluetooth chipset, or separate component, which may be powered by battery or other power supply components. In embodiments where it is desired to sense a variable pressure input, the electronics may also comprise an analogue-to-digital converter (ADC).

Figure 6A:
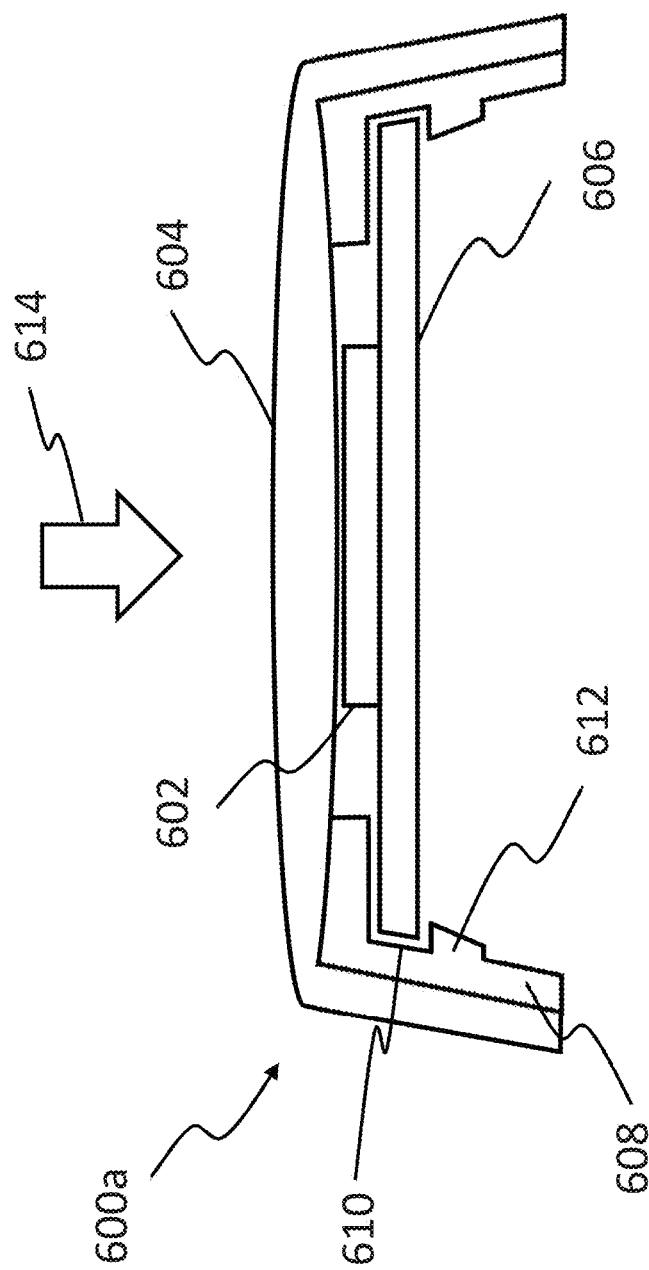
FIG. 6a shows a first arrangement for integrating a user input element into an in-ear audio listening device according to the disclosure.
Figure 6B:
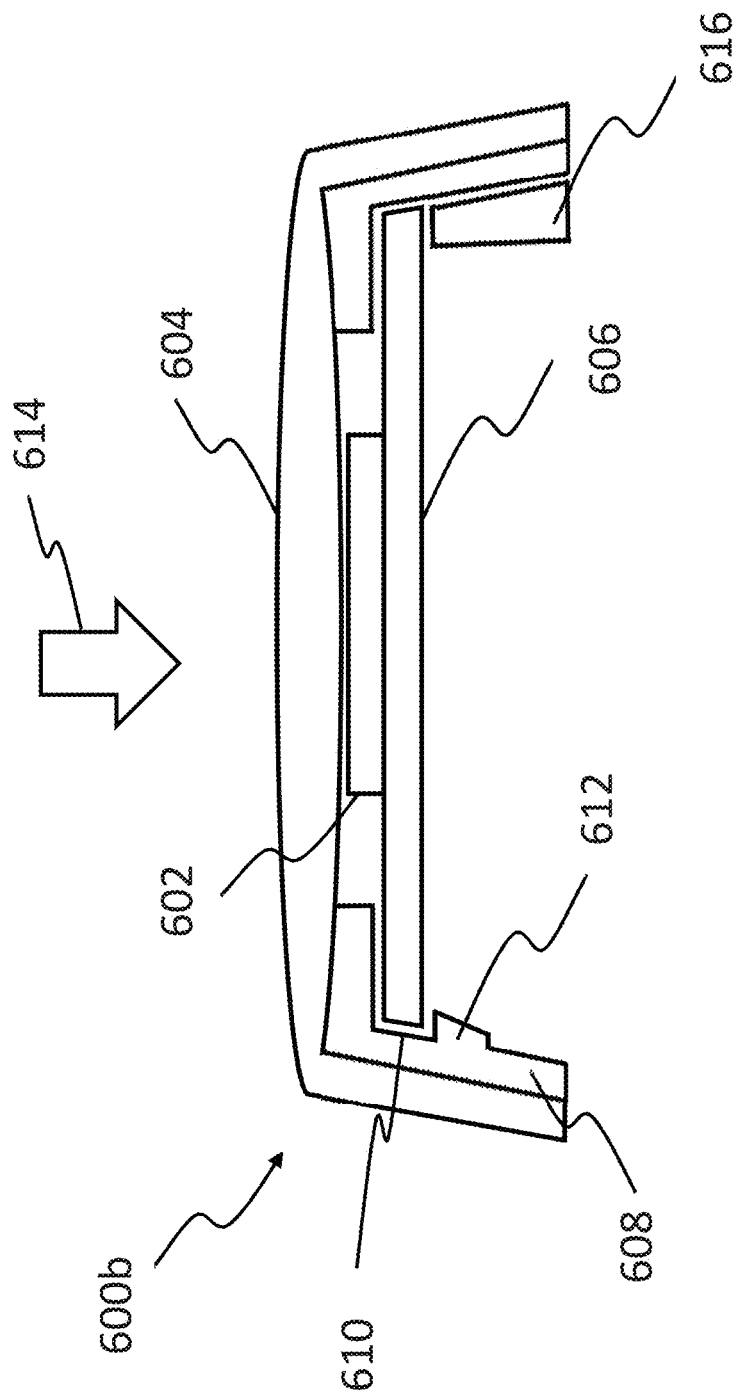
FIG. 6b shows a second arrangement for integrating a user input element into an in-ear audio listening device according to the disclosure.
Figure 6C:
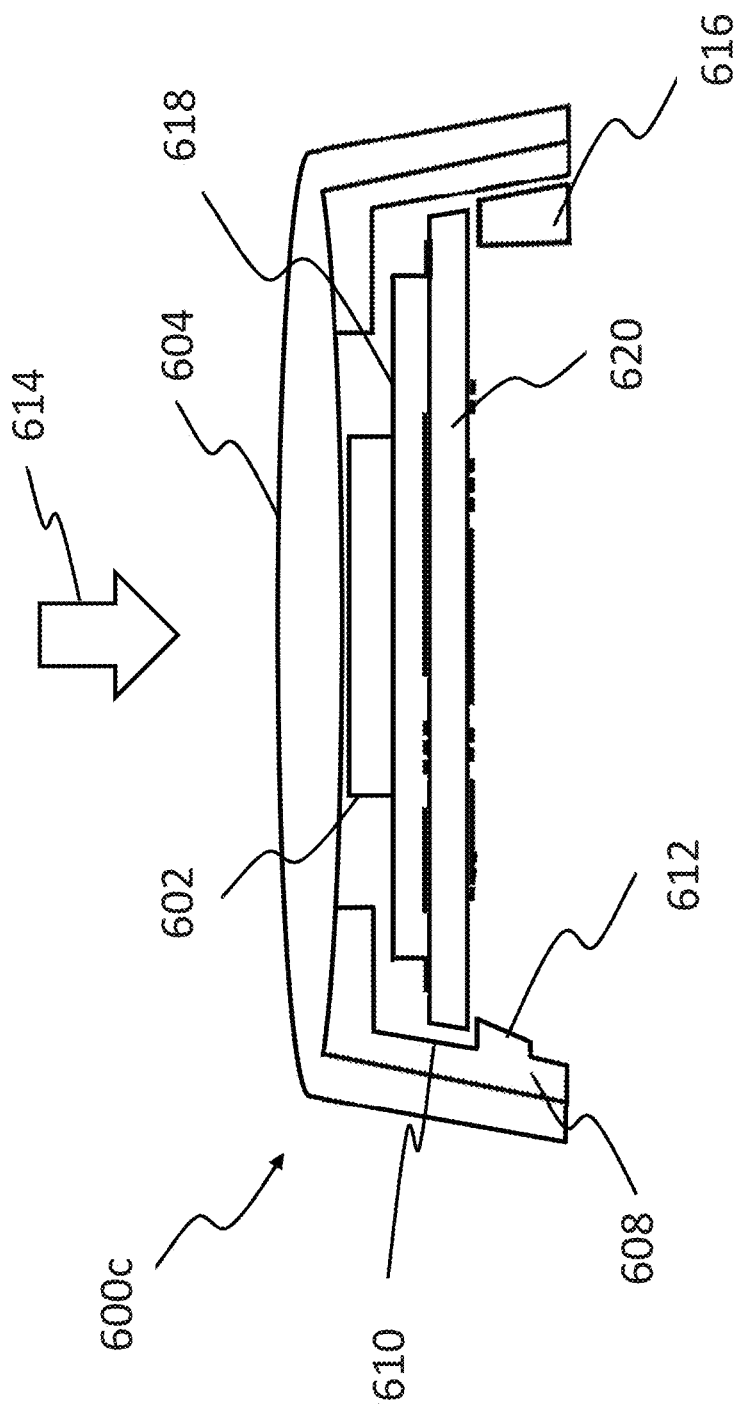
FIG. 6c shows a third arrangement for integrating a user input element into an in-ear audio listening device according to the disclosure.

FIGS. 6a-c show different arrangements 600 for integrating a user input element into an in-ear audio listening device. In FIGS. 6a-c, a user input element comprising a resilient contact portion, such as that shown in FIG. 5c, is illustrated. Each arrangement 600 comprises an FSR and a contact portion for receiving a user input.

FIG. 6a shows a first arrangement 600a comprising an FSR 602, a contact portion 604, a support element 606 and a housing 608 of an in-ear audio listening device. The housing may be part of the body portion 102 or the head portion 104 of the in-ear audio listening device 100 described in relation to FIG. 1.

The support element 606 is attached to the housing 608 in a groove 610 of the housing 608. The groove 612 may be provided by one or more retention elements 612, which may be integral with the housing 608. As such, the support element 606 may snap into place during assembly. The support element 606 may be constructed of any suitable material, for example a hard plastic or metal. The housing 608 may be constructed of a plastic material, such as a double injected thermoplastic polyurethane and/or a polycarbonate/acrylonitrile butadiene styrene blend.

The FSR 602 is disposed between the support element 606 and the contact portion 604. The support element 606 provides resistance against a force provided by a user input in the direction of arrow 614. This enables more accurate sensing of a user input by the FSR 602 as the FSR 602 is not displaced by any input force, and therefore senses such a force in a reliable manner. In this embodiment, the FSR 602 comprises an FPC, as described in relation to FIG. 2. The FPC is electrically connected to a PCB (not shown) for generating a control signal based on the detected user input. In some embodiments, the FSR 602 including the FPC is mounted directly on the PCB.

FIG. 6b shows a second arrangement 600b comprising an FSR 602, a contact portion 604, a support element 606 and a housing 608 of an in-ear audio listening device. The second arrangement 600b is substantially the same as the first arrangement 600a, except that the second arrangement 600b comprises one or more fastening elements 616 for maintaining the support element 606 in position within the housing 608. The one or more fastening elements 616 may be used in combination with the groove 610 and retention elements 612 of the first arrangement 600a, as shown in FIG. 6b, or in place of them. The use of a fastening element may increase the amount of force that can be applied to the user input element without displacing the FSR.

FIG. 6c shows a third arrangement 600c comprising an FSR 602, a contact portion 604, a housing 608 of an in-ear audio listening device, a support element 618 and a PCB 620. In this arrangement, the FSR 602 is disposed between the support element 618 and the contact portion 604, and the support element 618 is connected directly to the PCB 620. In this case, the support element 618 is a bridge that traverses the electronics of the PCB 620. In some embodiments, the support element 618 is a metal element that may be soldered to the PCB 620. In some embodiments, the support element may be a functional component such as a BT chip or other integrated circuit. A foam layer (not shown) may also be present between the BT chip and the FSR 602, and/or between the FSR 602 and the contact portion 604. The PCB 620 is attached to the housing 608 by a groove 610 and retention elements 612 as discussed in relation to the first arrangement 600a, and/or one or more fastening elements 616 as discussed in relation to the second arrangement 600b. The support element 618 and the PCB 620 provide resistance against a force provided by a user input in the direction of arrow 614.

In addition to the arrangements shown in FIGS. 6a-c, an in-ear audio listening device may also be provided with other sensor means, such as one or more accelerometers and/or microphones, to provide further sensor data for determining an input. This can help to eliminate false positives that may be detected by use of an FSR alone.

The embodiments disclosed above provide many advantages over current techniques for detecting user inputs on a headphone. As FSRS have a relatively low activation force compared to current push button implementations, the input element can detect taps as well as presses that are more forceful. This can minimise or even eliminate common pain points for interaction on devices that are located at sensitive areas of a user's body, such as inside a user's ear. A user input element comprising an FSR is capable of detecting a number of different types of user input, such as taps and sustained presses. This enables a number of different combinations of inputs to be mapped to different functions, increasing the range of control that can be provided to the user. A user input element as described above is able to function reliably even if the user has wet or dirty hands, is wearing gloves, scarves or hats, or has long hair. It also works well if the interaction area is contaminated, for example with water or dirt. Such an input element can be implemented with only a small footprint, so that space near the surface of a listening device can be saved for other functionality such as antennae. As the input element does not need to be attached directly under a top surface of the housing of a headphone, where antennae are generally disposed, there is a reduced risk of RF interference. FSRs do not require a large amount of power, so the disclosed user input elements have little to no effect on power consumption of the device in which they are used. This can be particularly advantageous with wireless headphones, which require power to connect to an associated media playback device.

Although particular embodiments have been disclosed in detail, this has been done for purpose of illustration only, and is not intended to be limiting. In particular, it is contemplated that various substitutions, alterations and modifications may be made within the scope of the appended claims. Moreover, although specific terms may be employed herein, they are used in a generic and descriptive sense only and not for purposes of limitation. Furthermore, as used herein, the terms "comprise/comprises" or "include/includes" do not exclude the presence of other elements.

What is claimed is:

1. An in-ear audio listening device comprising a user input element, the user input element comprising:
   a force-sensitive resistor (FSR); and
   a contact portion configured to receive a user input and, in turn, exert a force upon the FSR, wherein the FSR is configured to detect the force from the contact portion and generate an output for use in controlling operation of an electronic device associated with the in-ear audio listening device, wherein, when no external force is applied to the contact portion, there is an interference fit between the contact portion and the FSR of the user input element.

2. The in-ear audio listening device of claim 1, wherein the interference fit is configured to provide a preload force to the FSR that is higher than an activation force of the FSR.

3. The in-ear audio listening device of claim 2, wherein the preload force provided by the interference fit is a zero-level force, such that only external forces are used in generating the output.

4. The in-ear audio listening device of claim 1, wherein only the user input exerting a force on the FSR having an amplitude above a force threshold is used in controlling operation of an electronic device associated with the in-ear audio listening device.

5. The in-ear audio listening device of claim 4, wherein the force threshold is set relative to a preload force implemented in the user input element.

6. The in-ear audio listening device of claim 4, wherein the user input having a trigger point before a time threshold is used in controlling operation of an electronic device associated with the in-ear audio listening device, wherein the trigger point is a point at which the user input reaches the force threshold.

7. The in-ear audio listening device of claim 4, wherein the user input having a duration shorter than a first period defined by a first time threshold is a tap input, wherein the duration is a time difference between a trigger point of the output and a release point of the input, and wherein the release point is the point at which the user input returns below the force threshold.

8. The in-ear audio listening device of claim 7, wherein the user input having a duration longer than the first period is a hold input.

9. The in-ear audio listening device of claim 7, wherein:
   if a first user input is received having a duration shorter than the first period;

and
a second user input is received having a duration shorter than a second period defined by a second time threshold and having a second release point before the second time threshold;

then the first and second user inputs are a double tap input.

10. The in-ear audio listening device of claim 9, wherein:
if a third user input is received having a duration shorter than a third period defined by a third time threshold and having a third release point before the third time threshold;

then the first user input, the second user input, and the third user input are a triple tap input.

11. The in-ear audio listening device of claim 1, wherein:
the in-ear audio listening device further comprises a support element; and the FSR is disposed between the support element and the contact portion.

12. The in-ear audio listening device of claim 11, further comprising a housing, wherein the support element is configured to be connected to the housing.

13. The in-ear audio listening device of claim 12, wherein the support element is configured to be inserted into a groove of the housing.

14. The in-ear audio listening device of claim 12, wherein the support element is configured to be connected to the housing using a fastening element.

15. The in-ear audio listening device of claim 11, wherein the support element is configured to be connected to a printed circuit board (PCB).

16. The in-ear audio listening device of claim 15, further comprising a housing, wherein the PCB is connected to the housing.

17. The in-ear audio listening device of claim 1, wherein controlling operation of an electronic device associated with the in-ear audio listening device comprises at least one of the following:
controlling playback of audio from the in-ear audio listening device; activating a sensor;
answering or terminating a telephone call; starting or ending tracking of an activity; and enabling a voice assistant.

18. The in-ear audio listening device of claim 1, further comprising a loudspeaker for emitting sound signals into the ear of the user.

* * * * *